United States Patent
Yamazaki et al.

(10) Patent No.: US 10,185,398 B2
(45) Date of Patent: Jan. 22, 2019

(54) METHOD AND APPARATUS FOR DRIVING ACTUATORS USING A SHAPE MEMORY ALLOY

(71) Applicant: LENOVO (SINGAPORE) PTE. LTD., Singapore (SG)

(72) Inventors: Mitsuhiro Yamazaki, Kanagawa-ken (JP); Yasushi Tsukamoto, Kanagawa-ken (JP)

(73) Assignee: LENOVO (SINGAPORE) PTE LTD, Singapore (SG)

(*) Notice: Subject to any disclaimer, the term of this patent is extended or adjusted under 35 U.S.C. 154(b) by 0 days.

(21) Appl. No.: 15/605,809

(22) Filed: May 25, 2017

(65) Prior Publication Data

US 2017/0344118 A1 Nov. 30, 2017

(30) Foreign Application Priority Data

May 25, 2016 (JP) .................. 2016-104263

(51) Int. Cl.
*G06F 3/01* (2006.01)
*F03G 7/06* (2006.01)

(52) U.S. Cl.
CPC .............. *G06F 3/016* (2013.01); *F03G 7/06* (2013.01); *F03G 7/065* (2013.01)

(58) Field of Classification Search
CPC ................. G06F 3/016; F03G 7/065
See application file for complete search history.

(56) References Cited

U.S. PATENT DOCUMENTS

| | | | | |
|---|---|---|---|---|
| 2008/0238635 A1* | 10/2008 | Klinghult | .................. | G05G 5/05 340/407.1 |
| 2012/0174571 A1* | 7/2012 | Villanueva | .............. | F03G 7/065 60/527 |
| 2014/0139450 A1* | 5/2014 | Levesque | .................. | G08B 6/00 345/173 |
| 2014/0267069 A1* | 9/2014 | Dionne | .................. | G06F 3/0414 345/173 |
| 2017/0333788 A1* | 11/2017 | Grant | ...................... | A63F 13/24 |

FOREIGN PATENT DOCUMENTS

| | | |
|---|---|---|
| JP | 2007-247593 | 3/2006 |
| JP | 2008262478 A | 10/2008 |
| JP | 2010-078731 | 4/2010 |
| JP | 2011-096133 | 5/2011 |
| JP | 2012-159046 A | 8/2012 |
| JP | 2014-216024 | 11/2014 |
| JP | 2015-111416 | 6/2015 |
| JP | 5836276 | 11/2015 |
| JP | 2016-001470 | 1/2016 |
| JP | 2016-015698 A | 1/2016 |
| JP | 5878869 | 2/2016 |

* cited by examiner

*Primary Examiner* — Ryan Sherwin
(74) *Attorney, Agent, or Firm* — Antony P. Ng; Russell Ng PLLC

(57) ABSTRACT

An apparatus for driving an actuator using a shape memory alloy is provided. The apparatus includes an actuator having a shape memory alloy, a pulse signal generating device for generating a pulse signal, and a switch for applying a pseudo single pulse voltage signal to the actuator. The pseudo single pulse voltage signal is generated by performing switching control of a predetermined voltage according to a set of successive micro-pulse signals.

11 Claims, 6 Drawing Sheets

METHOD AND APPARATUS FOR DRIVING ACTUATORS USING A SHAPE MEMORY ALLOY

PRIORITY CLAIM

The present application claims benefit of priority under 35 U.S.C. §§ 120, 365 to the previously filed Japanese Patent Application No. JP2016-104263 with a priority to date of May 25, 2016, which is incorporated by reference herein.

TECHNICAL FIELD

The present invention relates to actuators in general, and in particular to a method and apparatus for driving actuators using a shape memory alloy.

BACKGROUND

In some cases, an actuator having a haptic feedback to provide a user with a tactile sensation is incorporated into a touch screen of a tablet terminal, a flat-type keyboard without key traveling, a touch-type operation switch without a keystroke or the like. Conventionally, an electromagnet, a piezoelectric element, a vibration motor or the like has been used as a driving part of an actuator. However, in recent years, a shape memory alloy (SMA), which has better performances in vibration intensity, response, and size, has become the more popular choice.

In an impact-driven actuator, a vibration intensity given to a vibrator is able to be adjusted by using the wave crest value and pulse width of a single pulse voltage applied to the SMA. It is, however, difficult to adjust an output of a DC-DC converter, which functions as a power source, according to a user's favorite haptic sense since the adjustment leads to a complicated circuit. Moreover, the adjustment of the pulse width changes the displacement amount of the impact-driven actuator, and thus changes the frequency of acceleration. The change in the frequency of acceleration leads to a change in the feeling of vibration on a finger, and therefore sometimes it is required to adjust the vibration intensity without changing the frequency of acceleration.

Consequently, it would be preferable to provide an improved apparatus for driving an actuator.

SUMMARY

In accordance with an embodiment of the present disclosure, a driving apparatus includes an actuator having a shape memory alloy, a pulse signal generating device for generating a pulse signal, and a switch for applying a pseudo single pulse voltage, which is generated by performing switching control of a predetermined voltage based on a set of successive pulse signals, to the actuator.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

I. Terminology

Special terms used in the present specification will be described. An actuator using SMA acts in a hysteresis cycle (a thermal cycle) between a martensitic phase (a low temperature phase) and an austenitic phase. The actuator performs a regular motion in itself to provide a vibration to a vibrator. The actuator using SMA includes an impact-driven actuator and a vibration-type actuator.

The impact-driven actuator is able to generate aimed vibration with one single pulse voltage or one thermal cycle. The vibration-type actuator generates the aimed vibration with a plurality of single pulse voltages repeatedly applied at predetermined intervals enabling the thermal cycle. Although a driving system according to the present invention is applicable to both types of actuators, the description will be made by giving an example of the impact-driven actuator in the present specification.

A single pulse voltage, which is a voltage present only for a short predetermined energizing time, supplies heat, which is required for one-time drive of an actuator, to SMA. The single pulse voltage acts as an electric current for the contraction of SMA, and therefore it is possible to restate the single pulse voltage as single pulse current. The voltage waveform during energizing time may be an arbitrary waveform such as that of a rectangular wave, a differential wave, a triangular wave, or a staircase wave whose wave crest value varies stepwise.

The vibrator corresponds to an object which provides required vibration at one single pulse voltage applied to the impact-driven actuator. Although the vibrator does not need to be particularly limited, the vibrator may be an object such as, for example, a touch panel, a keyboard, or a switch which gives a haptic feedback to a finger touching it when a human performs an operation. When continuously applying a single pulse voltage to an impact-driven actuator and a vibration-type actuator, it is necessary to provide predetermined intervals to maintain a complete thermal cycle.

Figure 1A:
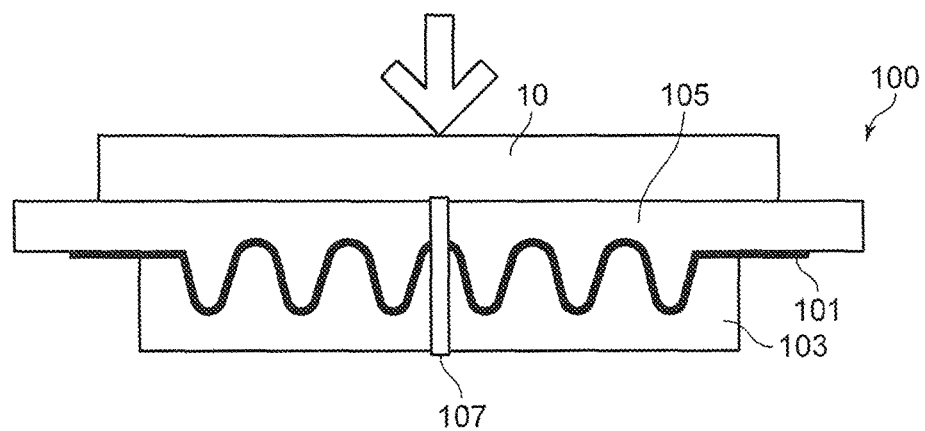
FIGS. 1A-1B are diagrams showing the structure of an impact-driven actuator.
Figure 1B:
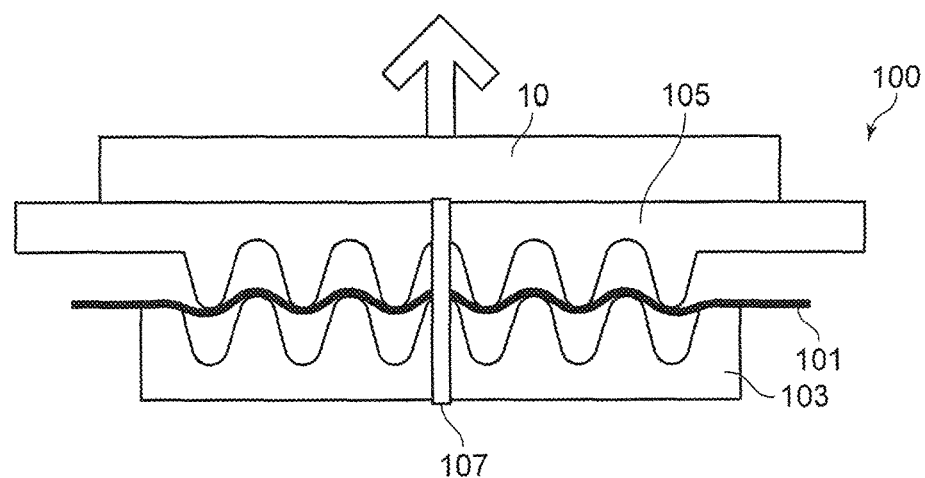

Although the present invention is applicable to any of the impact-driven actuator and the vibration-type actuator, the following description will be made by giving an example of an impact-driven actuator 100. FIGS. 1A-1B are diagrams describing the structure of the impact-driven actuator 100. The impact-driven actuator 100 includes a stator 103, a mover 105, an SMA 101, and a bias material 107. The impact-driven actuator 100 provides an impulsive or transient vibration to the vibrator 10. The SMA 101 repeatedly acts by means of one-way shape memory and a bias force. Note that, however, the present invention is also applicable to an actuator in which SMA which conducts a two-way shape memory is used.

Facing surfaces of the stator 103 and the mover 105 facing each other are formed in a wavelike fashion so that their concave-convex surfaces fit together. Linear SMA 101 is arranged between the facing surfaces. For the SMA 101, nickel-titanium alloy, titanium-nickel-copper alloy, or the like may be selected, for example, but it does not need to be particularly limited. The bias material 107 may be formed by an elastic body which applies a bias force in a direction where the stator 103 and the mover 105 come close to each other.

FIG. 1A illustrates a state in which the SMA 101 reaches a temperature equal to or lower than a martensitic transformation finish temperature Mf (FIG. 2) and shows a flexible property. The mover 105 comes close to the stator 103 by means of the bias force which the bias material 107 applied to the mover 105, by which their facing surfaces fit together. The SMA 101 plastically deformed between the facing surfaces extends up to the maximum length along the wavelike shapes of the stator 103 and the mover 105. The state in which the SMA 101 is plastically deformed by the facing surfaces and the bias material 107 and has the maximum length is referred to as perfectly extended state.

FIG. 1B illustrates a state in which the SMA 101 contracts and cures accompanying a temperature rise and the temperature of the SMA 101 exceeds the austenitic transformation finish temperature Af (FIG. 2), by which the shape of the SMA 101 returns to the memorized shape. The state in which the contraction of the SMA 101 is finished is referred to as perfectly contracted state. The mover 105, which has received a force from the SMA 101 during a transition from the perfectly extended state to the perfectly contracted state, is displaced so that the distance from the stator 103 increases against the bias force. When a single pulse voltage is applied to the impact-driven actuator 100, the SMA 101 undergoes a phase transition from the perfectly extended state to the to perfectly contracted state with one thermal cycle. Furthermore, the SMA 101 returns to the perfectly extended state when the energizing time ends.

Figure 2:
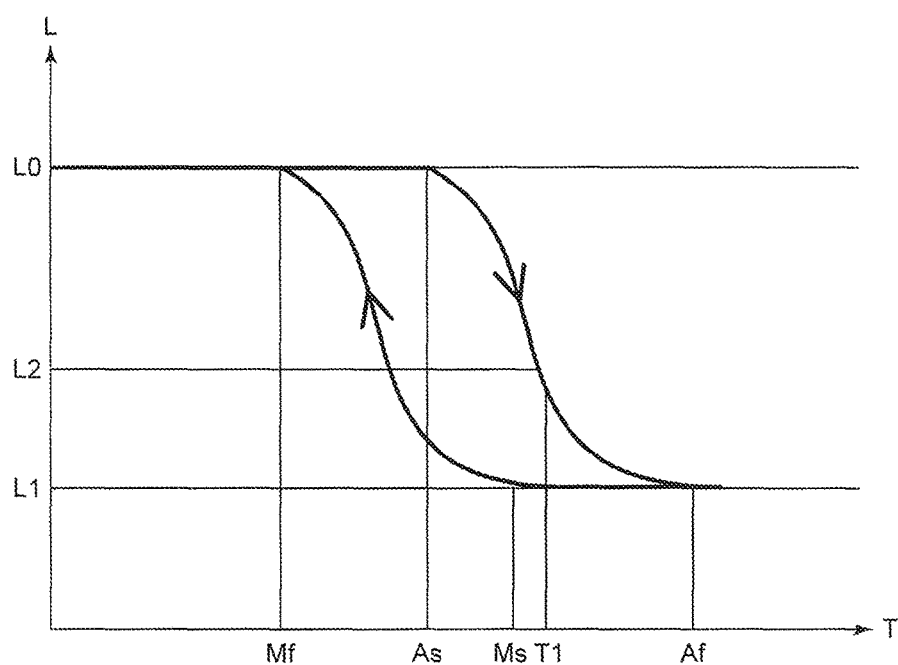
FIG. 2 is a diagram describing a state in which the temperature and length of a shape memory alloy (SMA) changes according to a thermal cycle.

FIG. 2 is a diagram describing a state in which the temperature and length of the SMA 101 changes according to the thermal cycle. The horizontal axis represents a temperature T of the SMA 101 and the vertical axis represents a length L. When the temperature of the SMA 101 is equal to or lower than the martensitic transformation finish temperature Mf, the SMA 101 wholly undergoes a phase transition substantially to a martensitic phase. In the martensitic phase, the SMA 101 has flexibility and therefore is able to be plastically deformed by application of a bias force.

If a voltage is applied to the SMA 101, which undergoes the phase transition to the martensitic phase, for electrical heating, a reverse martensitic transformation starts when the temperature of the SMA 101 exceeds the austenitic transformation start temperature As and the SMA 101 starts to contract. Furthermore, when its temperature has reached the austenitic transformation finish temperature Af, the contraction ends and the SMA 101 returns to the perfectly contracted state of the length L1 (L1<L0). A process in which the temperature rises from the austenitic transformation start temperature As to the austenitic transformation finish temperature Af will be referred to as complete temperature rising process.

If energization is stopped in the perfectly contracted state, the temperature decreases due to heat dissipation and a martensitic transformation starts at the martensitic transformation start temperature Ms, by which the SMA 101 gradually softens. During this period of time, the SMA 101 gradually extends according to the degree of softening and the bias force. Then, when the temperature has reached the martensitic transformation finish temperature Mf, the extension ends and the SMA 101 comes into the perfectly extended state of the length L0. The process in which the temperature decreases from the martensitic transformation start temperature Ms to the martensitic transformation finish temperature Mf will be referred to as complete temperature falling process. In the complete temperature falling process, the length of the SMA 101 changes from the perfectly contracted state to the perfectly extended state.

The SMA 101 extends or contracts in length by d (L0−L1=d) during a complete thermal cycle composed of a one-time complete temperature rising process and a one-time complete temperature falling process. The mover 105 applies a bending stress to the vibrator 10 in the perfectly contracted state of the length L1 and releases the bending stress in the perfectly extended state of the length L0. The vibrator 10 vibrates in response to the rapid stress application and releasing caused by a single pulse voltage. The level of vibration is able to be adjusted by the displacement amount and displacement velocity of the mover 105.

The displacement amount of the mover 105 depends on the contraction amount of the SMA 101, in other words, the temperature thereof. For example, even in the case of using a single pulse voltage having the same wave crest value, if the energizing time ends at a temperature T1 before reaching the austenitic transformation finish temperature Af due to a narrow pulse width, the SMA 101 contracts only up to the length L2 (L2>L1) and therefore the displacement amount of the mover 105 is less than the thermal cycle of the complete temperature rising process. Therefore, the displacement of the vibrator 10 is small and the acceleration decreases.

The temperature rising process with a single pulse voltage whose pulse width is small in which the energizing time ends before reaching the austenitic transformation finish temperature Af will be referred to as incomplete temperature rising process. In addition, if the wave crest value is small even in the case of a single pulse voltage with the same energizing time, the energization stops before transition to the perfectly contracted state in some cases and thereby a phase transition occurs in the incomplete temperature rising process. Furthermore, even in the case of the same energizing time, the higher the wave crest value is, the shorter the time of contraction up to the length L1 is and thus the higher the displacement velocity of the mover 105 is. The voltage continuing after the SMA 101 has reached the perfectly contracted state does not affect the displacement of the mover 105, in other words, the vibration intensity thereof, and therefore the energy is wastefully consumed. Furthermore, if the voltage application time in the perfectly contracted state is too long, the deterioration of the SMA 101 is accelerated.

Figure 3A:
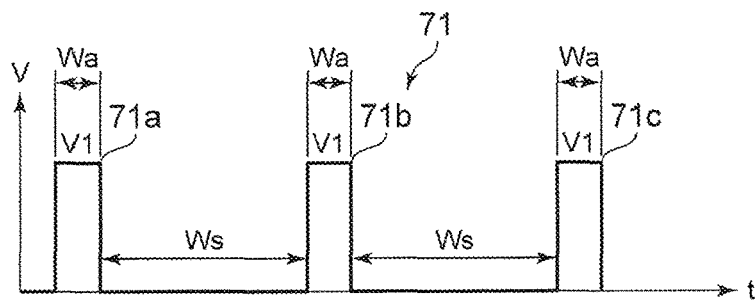
FIGS. 3A-3D are diagrams describing the type of pulse voltage allowed to be applied to an impact-driven actuator.

FIGS. 3A-3D are diagrams describing the type of pulse voltage allowed to be applied to the impact-driven actuator 100. When the single pulse voltage is applied to the SMA 101, a single pulse current flows according to the magnitude of the resistance value at that time point, and Joule heat is generated according to the magnitude of the resistance value and the voltage or current. FIG. 3A illustrates a pulse voltage group 71 including single pulse voltages 71a to 71c having the same wave crest value V1 and pulse width Wa corresponding to energizing time.

In the pulse voltage group 71, non-energizing time Ws is set between the adjacent single pulse voltages 71a to 71c. In order to demonstrate a predetermined performance, the impact-driven actuator 100 needs to end the complete temperature falling process in the thermal cycle described with reference to FIG. 2. The time required for a phase transition from the perfectly contracted state to the perfectly extended state will be referred to as recovery time. Therefore, the non-energizing time Ws needs to be longer than the recovery time. Furthermore, the non-energizing time Ws is sometimes longer than the recovery time according to the amount of stress permissible in a short time by the impact-driven actuator 100. When the pulse voltage group 71 is applied, the values of the acceleration of the vibrator 10 are constant when the respective single pulse voltages 71a to 71c are applied.

Figure 3B:
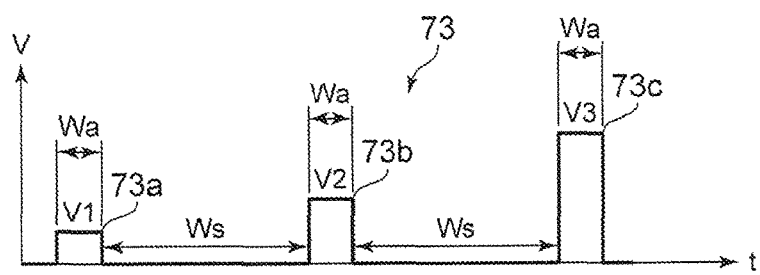

FIG. 3B illustrates a pulse voltage group 73 including single pulse voltages 73a to 73c having the same pulse width Wa and different wave crest values V1 to V3 respectively. When the pulse voltage group 73 is applied, there is a change in the acceleration of the vibrator 10 obtained when the respective single pulse voltages 73a to 73c are applied, while there is little change in the frequency. Therefore, if this type of pulse voltage is used for a haptic feedback, a similar haptic sense is obtained with a difference only in the vibration intensity conveniently.

Figure 3C:
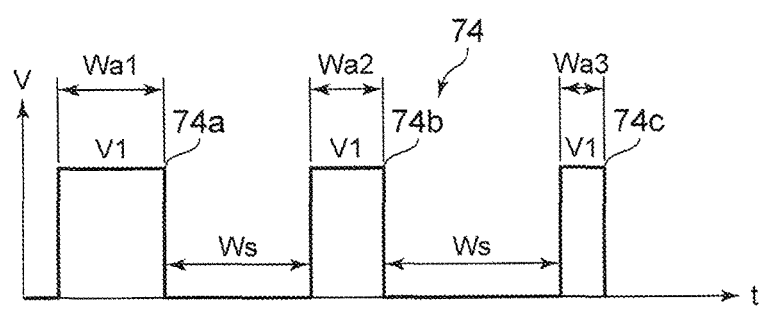

FIG. 3C illustrates a pulse voltage group 74 including single pulse voltages 74a to 74c having the same wave crest value V1 and different pulse widths Wa1 to Wa3 respectively. If the complete temperature rising process is able to be formed by the single pulse voltage 74a having the pulse width Wa1, the pulse widths Wa2 and Wa3 for adjusting the vibration intensity are smaller than the pulse width Wa1 in order to form the incomplete temperature rising process. When the pulse voltage group 74 is applied, there is a change in not only the acceleration of the vibrator 10 generated by the respective single pulse voltages 74a to 74c, but also in the frequency. Therefore, if this type of pulse voltage is used for the haptic feedback, not only the vibration intensity, but also the haptic sense changes and thereby a user experiences an uncomfortable feeling in some cases. Therefore, in the case of use for a haptic feedback, it is more preferable to control the wave crest value.

Figure 3D:
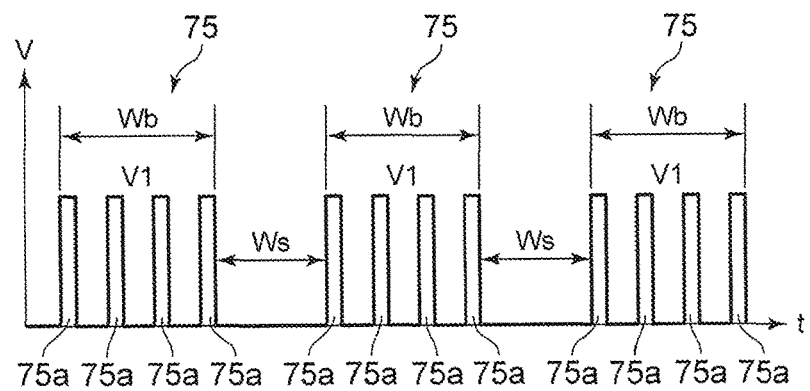

FIG. 3D illustrates a pseudo single pulse voltage 75 including a plurality of sub-pulse voltages 75a each having energizing time Wb and a wave crest value V1. The pseudo single pulse voltage 75 is able to generate the single pulse voltage 71a by switching control and the energizing time Wb at that time corresponds to the pulse width Wa of the single pulse voltage 71a. The single pulse voltage 71a not intermittent during the energizing time for the pseudo single pulse voltage 75 is referred to as normal single pulse voltage.

Figure 4:
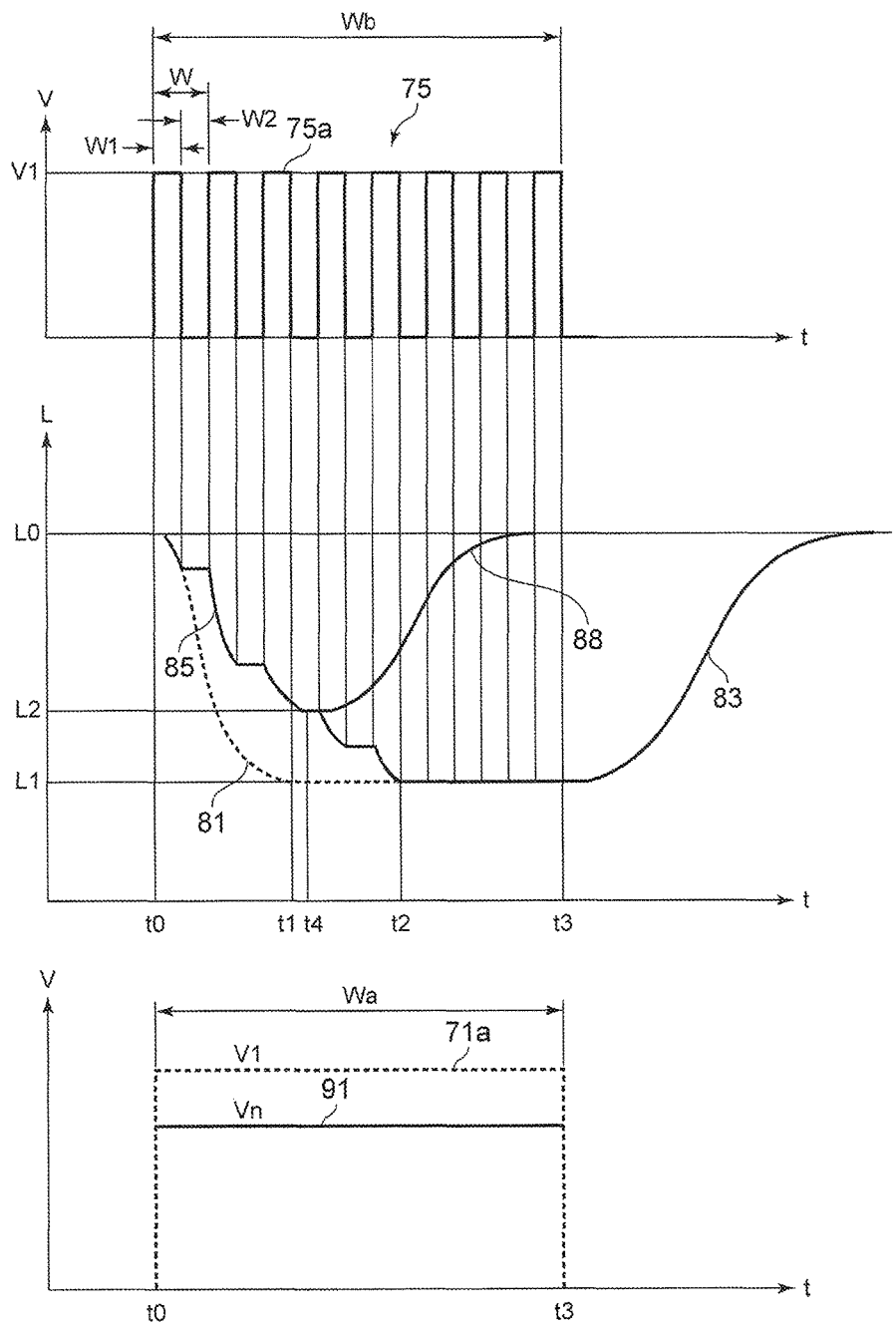
FIG. 4 is a diagram describing a state in which the SMA responds to a pseudo single pulse voltage.

FIG. 4 is a diagram describing a state in which the SMA 101 responds to the pseudo single pulse voltage 75. In FIG. 4, there is also illustrated a response obtained when the normal single pulse voltage 71a is applied for comparison. First, description will be made on a state in which the normal single pulse voltage 71a is applied. When the normal single pulse voltage 71a is applied at time t0, the SMA 101 contracts along a line 81. Thereafter, the SMA 101 comes into the perfectly contracted state at time t1 and then to maintains the length L1 until time t3. If the energizing time Wa ends at time t3, the temperature decreases and the length of the SMA 101 returns to the length L0 along a line 83.

The pseudo single pulse voltage 75 is able to include a plurality of sub-pulse is voltages 75a having a period W, an on-period W1, and an off-period W2 generated by PWM control of the normal single pulse voltage 71a. The sub-pulse voltages 75a may be generated by PFM control of the normal single pulse voltage 71a having a constant on-period or a constant off-period, instead of the PWM control. The off-period W2 is shorter than the period of time of the complete temperature falling process required for achieving the complete thermal cycle.

The off-period W2 is able to be selected so that the temperature of the SMA 101 does not fall to the martensitic transformation finish temperature Mf after the on-period W1 ends in the temperature rising process. For example, the off-period W2 is able to be made a period of time during which the temperature that has risen during the on-period W1 does not fall. Furthermore, in another example, the off-period W2, which follows the on-period W1, is able to be made a period of time during which the length at the contraction in the on-period W1 does not increase.

If the pseudo single pulse voltage 75 is applied to the SMA 101 at time t0, the temperature rises in the on-period W1 and the SMA 101 contracts and the contraction is able to be stopped in the off-period W2. In this embodiment, the off-period W2 is made short to a degree that the temperature does not almost decrease or to a degree that the SMA 101 does not almost extend, and therefore the length of the SMA 101 does not almost change during the off-period W2.

The SMA 101 contracts along a line 85 due to the intermittence of the sub-pulse voltages 75a, the complete temperature rising process ends at time t2, and thereafter the length L1 is maintained until time t3. Upon the end of the energizing time Wb at time t3, the temperature of the SMA 101 decreases and the length thereof returns to the length L0 along the line 83 by a bias force in the same manner as in the case where the normal single pulse voltage 71a is applied.

The pseudo single pulse voltage 75 is able to include the plurality of sub-pulse voltages 75a so as to adjust the displacement velocity and the displacement amount of the mover 105 in the temperature rising process. The amount of heat supplied by the pseudo single pulse voltage 75 during the period from time t0 to time t3 is equivalent to that in the case of applying a normal single pulse voltage 91 having a wave crest value Vn (Vn<V1).

As apparent from the comparison between the line 81 and the line 85, if the pseudo single pulse voltage 75 is applied, a period of time until the SMA 101 transitions to the perfectly contracted state is longer than a period of time taken in the case of applying the normal single pulse voltage 71a. It means that the acceleration given to the vibrator 10 is reduced. Moreover, in the case where the pseudo single pulse voltage 75 is applied and the SMA 101 transitions to the perfectly contracted state, the displacement amount of the mover 105 is the same as that in the case of applying the normal single pulse voltage 71a and therefore the frequency of acceleration does not almost change.

The pseudo single pulse voltage 75 changes the duty ratio of the sub-pulse voltages 75a by the PWM control or PFM control, thereby enabling the adjustment of the acceleration of the mover 105. If the pseudo single pulse voltage 75 is stopped at time t4 before the end of the complete temperature rising process, the SMA 101 contracts up to the length L2 (L2>L1) and then extends up to the length L0 along a line 88. In this case, the frequency of acceleration also changes though the acceleration can be adjusted in the same manner as the single pulse voltages 74b and 74c (FIG. 3) whose pulse widths are adjusted.

II. Driving System of Actuator

Figure 5:
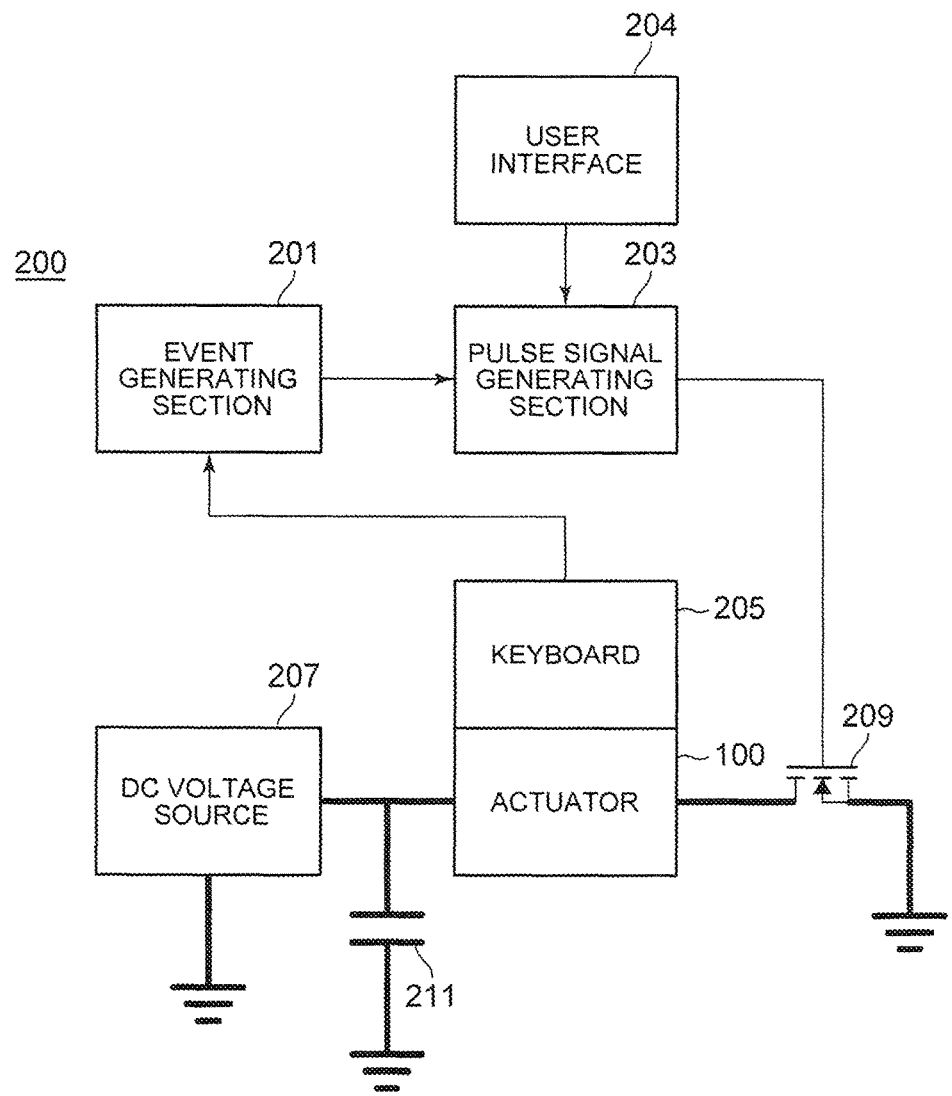
FIG. 5 is a functional block diagram of a driving system for the impact-driven actuator.

FIG. 5 is a functional block diagram illustrating the configuration of a driving system 200 for the impact-driven actuator 100. The driving system 200 includes an event generating section 201, a pulse signal generating section 203, a user interface 204, a flat-type keyboard 205, a DC voltage source 207, an impact-driven actuator 100, an N-type FET 209, and a capacitor 211. A part of the event generating section 201, the pulse signal generating section 203, and the user interface may include a system on chip (SoC) or a dedicated controller.

The keyboard 205 corresponds to an example of the vibrator 10 in FIG. 1. The keyboard 205 is a keyboard of a type free from tactile as in the case of a pantograph-type keyboard at an input on the keyboard 205. The keyboard 205 includes keys typically not independent of each other and the surface of the keyboard 205 is covered with a continuous sheet. The keyboard 205 outputs a make code and a break code of a key or one of the key codes to the event generating section 201. The keyboard 205 may be a software keyboard formed of a touch screen.

The event generating section 201 outputs an action event to the pulse signal generating section 203 at a timing when receiving the key code. The event generating section 201 is able to transmit an action event, by which the make code and the break code can be identified, to the pulse signal generating section 203. The event generating section 201 is able to associate a normal single pulse voltage 71a or a pseudo single pulse voltage with the type of the action event and to provide an indication thereof to the pulse signal generating section 203. The pulse signal generating section 203 outputs a pulse signal for applying the normal single pulse voltage 71a or the pseudo single pulse voltage 75 to a gate of the FET 209 at a timing when receiving the action event. The pulse signal for applying the pseudo single pulse voltage 75 includes sub-pulse signals corresponding to the sub-pulse voltages 75a.

In the case of outputting the normal single pulse voltage 71a or the pseudo single pulse voltage 75 for successive make and break codes, the pulse signal generating section 203 secures a non-energizing time Ws if outputting the pseudo single pulse voltage 75 for the break code. The user interface 204 includes a touch screen and provides an interface for a user to set parameters such as the period W, the on-period W1, and the off-period W2 of the sub-pulse voltage 75a, and the energizing time Ws therefor. The user interface 204 sets the parameters in the pulse signal generating section 203.

The user is able to set a user's favorite vibration after experiencing a haptic feedback with various parameters set through the user interface 204. The pulse signal generating section 203 is able to output pulse signals corresponding to different parameters when applying pseudo single pulse voltages 75 corresponding to the make and break codes. When a user's key input occurs, the impact-driven actuator 100 provides a vibration to the substrate of the keyboard 205 while a finger touches the key.

The DC voltage source 207 is formed by a DC-DC converter and outputs a predetermined DC voltage. In this embodiment, the output voltage of the DC voltage source 207 does not change. The capacitor 211 charges during the off-period of the FET 209 and discharges during the on-period thereof and energizes the impact-driven actuator 100. The FET 209 is a semiconductor device which performs switching control of the DC voltage and a bipolar transistor may be used as the FET 209. In addition, the capacitor 211 may be omitted as long as the DC voltage source 207 has a sufficient capacity.

Figure 6:
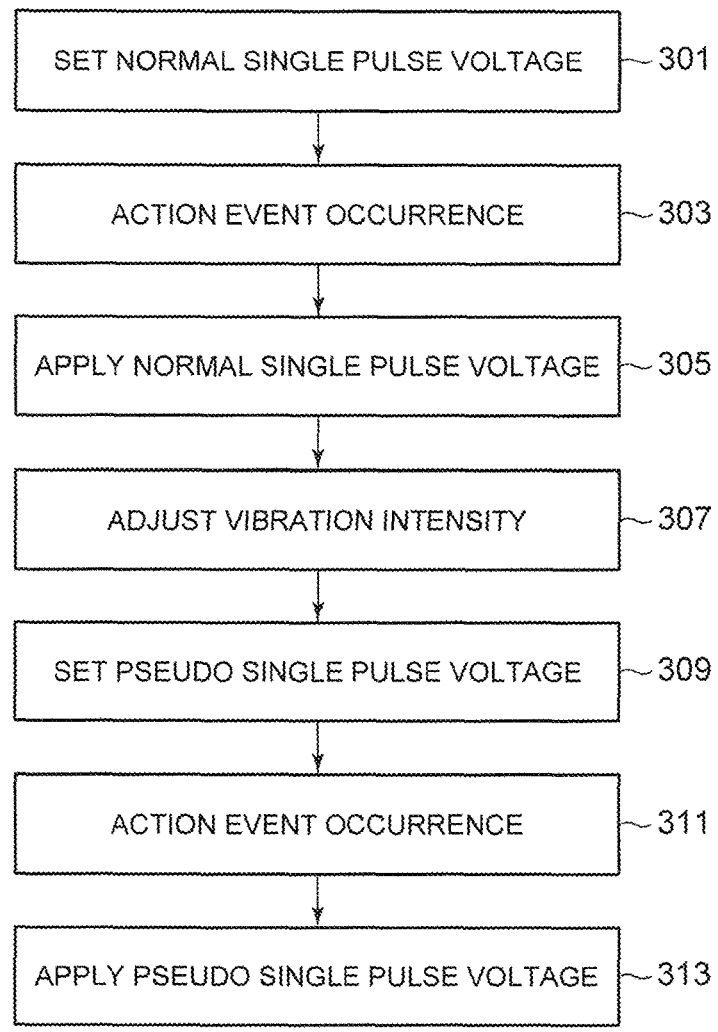
FIG. 6 is a flowchart of a method for controlling the driving system from FIG. 5.

FIG. 6 is a flowchart illustrating the action of the driving system 200. In block 301, a normal single pulse voltage 71a having a wave crest value V1 and a pulse width Wa is set in the pulse signal generating section 203. Every time the event generating section 201 outputs an action event in block 303, the normal single pulse voltage 71a is applied to the impact-driven actuator 100 in block 305. In block 307, the user adjusts the vibration intensity through the user interface 204.

For the adjustment of the vibration intensity, a duty ratio of the sub-pulse voltage 75a and, if necessary, energizing time Wb are set in the pulse signal generating section 203 in block 309. Every time the event generating section 201 outputs an action event in block 311, a pseudo single pulse voltage 75 having a wave crest value V1 and energizing time Wb is applied to the impact-driven actuator 100 in block 313. Regarding the pulse signal generating section 203, the value of the energizing time Wb may be the same value as the pulse width Wa of the single pulse voltage 71a.

The driving system 200 is applicable to a touch screen of a tablet terminal or of a smartphone or to all types of switches without operation strokes, by using the keyboard 205 instead of the vibrator 10. The driving system 200 is able to easily generate the pseudo single pulse voltage 75 from the normal single pulse voltage 71a without controlling the output voltage of the DC voltage source 207.

Therefore, switching between the normal single pulse voltage 71a and the pseudo single pulse voltage 75 is able to be easily performed. In the case of applying the driving system 200 to a touch screen by using this feature, the event generating section 201 and the pulse signal generating section 203 are able to use the normal single pulse voltage 71a and the pseudo single pulse voltage 75 differently according to the software keyboard or a manipulated object such as a startup icon for an application. Alternatively, it is also possible to apply the normal single pulse voltage 71a according to a make code and to apply the pseudo single pulse voltage 75 according to a break code.

As has been described, the present invention provides an improved method and apparatus for driving an actuator.

While the invention has been particularly shown and described with reference to a preferred embodiment, it will be understood by those skilled in the art that various changes in form and detail may be made therein without departing from the spirit and scope of the invention.

What is claimed is:

1. An apparatus comprising:
   an actuator having a shape memory alloy;
   a pulse signal generating device outputs a pulse signal, wherein said pulse signal generating device stops the output of said pulse signal before said shape memory alloy transitions to a fully contracted state; and
   a switch applies a pseudo single pulse voltage signal to said actuator, wherein said pseudo single pulse voltage signal is generated by performing switching control of a predetermined voltage according to a plurality of consecutive micro-pulse signals.

2. The apparatus of claim 1, wherein said actuator is an impact-driven actuator that generates an aimed vibration in one thermal cycle.

3. The apparatus of claim 1, wherein an off-period of said pulse signal is shorter than a period of time taken by said shape memory alloy to complete a phase transition from a fully contracted state to a fully extended state.

4. The apparatus of claim 1, wherein an off-period of said pulse signal is shorter than a period of time until said shape memory alloy having contracted during an on-period starts to extend.

5. The apparatus of claim 1, wherein an off-period of said pulse signal is shorter than a period of time until a temperature having risen during said on-period starts to decrease.

6. The apparatus of claim 1, wherein said pulse signal generating device generates said plurality of successive pulse signals by pulse-width modulation control of a single pulse signal.

7. The apparatus of claim 1, wherein said apparatus includes a keyboard.

8. An electronic device comprising:

a vibrator;

an actuator having a shape memory alloy that vibrates said vibrator;

an event generating device outputs an action event according to a finger operation on said vibrator;

a pulse signal generating device outputs a plurality of micro-pulse signals according to said action event, wherein said pulse signal generating device stops the output of said plurality of micro-pulse signals before said shape memory alloy transitions to a fully contracted state; and a switch applies a pseudo single pulse voltage signal to said actuator, wherein said pseudo single pulse voltage signal is generated by performing switching control of a predetermined voltage according to said plurality of micro-pulse signals.

9. The electronic device of claim 8, wherein said pulse signal generating device outputs said pulse signal by applying a normal single pulse voltage according to said action event.

10. The electronic device of claim 8, wherein said pulse signal generating device outputs said a pulse signal by applying said plurality of micro-pulse signals according to said action event.

11. A method comprising:

driving an actuator with a single pulse voltage signal;

setting a parameter for adjusting a vibration intensity;

driving said actuator with a pseudo single pulse voltage signal generated by performing switching control on said single pulse voltage signal according to said parameter;

receiving an action event;

applying a plurality of micro-pulse voltage signals to said actuator according to said action event in a period shorter than a period of time taken by a shape memory alloy to complete a transition from a fully contracted state to a fully extended state; and stopping said micro-pulse voltage signals after said transition of said shape memory alloy to said fully contracted state.

* * * * *